US012021811B2

(12) United States Patent
Pande

(10) Patent No.: US 12,021,811 B2
(45) Date of Patent: Jun. 25, 2024

(54) SYSTEMS AND METHODS FOR TRACKING TOPICS FOR COMMUNICATIONS ACROSS A DISTRIBUTED NETWORKED COMPUTING ENVIRONMENT

(71) Applicant: Open Text Holdings, Inc., San Mateo, CA (US)

(72) Inventor: Vaibhav Pradip Pande, Amravati (IN)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

(21) Appl. No.: 18/073,792

(22) Filed: Dec. 2, 2022

(65) Prior Publication Data

US 2023/0179557 A1    Jun. 8, 2023

Related U.S. Application Data

(60) Provisional application No. 63/285,845, filed on Dec. 3, 2021.

(51) Int. Cl.
*H04L 51/216* (2022.01)
*G06Q 10/107* (2023.01)
*H04L 51/56* (2022.01)

(52) U.S. Cl.
CPC ......... *H04L 51/216* (2022.05); *G06Q 10/107* (2013.01); *H04L 51/56* (2022.05)

(58) Field of Classification Search
CPC ....... H04L 51/216; H04L 51/56; H04L 51/04; H04L 51/046; G06Q 10/107
See application file for complete search history.

(56) References Cited

U.S. PATENT DOCUMENTS

| 10,191,951 | B1 * | 1/2019 | Bronstein | G06F 16/24578 |
|---|---|---|---|---|
| 2010/0017483 | A1 * | 1/2010 | Estrada | G06Q 10/107 |
| | | | | 709/206 |
| 2013/0007137 | A1 * | 1/2013 | Azzam | H04L 51/216 |
| | | | | 709/206 |
| 2013/0262594 | A1 * | 10/2013 | Bastide | H04L 67/535 |
| | | | | 709/206 |
| 2015/0074194 | A1 * | 3/2015 | Schabes | H04L 51/52 |
| | | | | 709/204 |
| 2016/0241494 | A1 * | 8/2016 | Badge | H04L 51/046 |
| 2019/0163760 | A1 * | 5/2019 | Baumann | G06F 40/279 |
| 2019/0213255 | A1 * | 7/2019 | Benantar | G06F 16/907 |
| 2021/0006524 | A1 * | 1/2021 | Muthuswamy | H04L 51/216 |
| 2022/0385606 | A1 * | 12/2022 | Hassan | H04L 51/216 |
| 2022/0385609 | A1 * | 12/2022 | Hassan | H04L 51/216 |

\* cited by examiner

*Primary Examiner* — Johnny B Aguiar
(74) *Attorney, Agent, or Firm* — Sprinkle IP Law Group

(57) ABSTRACT

Systems and methods for tracking topics related to communications for use with multiple channels of electronic communication and across different communication platforms for those channels are disclosed.

21 Claims, 5 Drawing Sheets

SYSTEMS AND METHODS FOR TRACKING TOPICS FOR COMMUNICATIONS ACROSS A DISTRIBUTED NETWORKED COMPUTING ENVIRONMENT

RELATED APPLICATIONS

This application claims the benefit of priority under 35 U.S.C. § 119(e) to U.S. Provisional Patent Application No. 63/285,845, entitled "SYSTEMS AND METHODS FOR TRACKING TOPICS FOR COMMUNICATIONS ACROSS A DISTRIBUTED NETWORKED COMPUTING ENVIRONMENT," filed Dec. 3, 2021, which is hereby fully incorporated herein by reference for all purposes.

TECHNICAL FIELD

This disclosure relates generally to communications in a distributed and networked computing environment. More particularly, this disclosure relates to embodiments of systems and methods for tracking topics related to communications. Even more specifically, this disclosure relates to embodiments of systems and methods for tracking topics related to communications for use with multiple channels of electronic communication and across different communication platforms for those channels.

BACKGROUND

Ever since the advent of the computer networks (including the Internet), enterprise environments have been steadily growing more complicated, encompassing an ever-expanding amount of increasingly complex digital assets (or just assets). A microcosm of these developments is represented with respect to electronic communications utilized across these distributed computer networks. Specifically, there are now a number of electronic communication channels such as email, content collaboration platforms, and multiple types of chat services (e.g., chatbots, enterprise (inter-office) messaging services, collaboration services, instant messengers, etc.).

Each of these communication channels may, additionally, have multiple applications which allow access to that channel. For example, email may be accessed through a number of applications (e.g., Microsoft® Outlook®, Gmail®, etc.) which may, themselves be accessed through different channels (e.g., through a desktop application, through a browser based interface) hosted locally within an enterprise or hosted remotely from an enterprise (e.g., in the cloud or more generally through a third party provider). Complicating this situation even further, in many cases such electronic communication may not be confined to a particular entity. As but one example, emails may be directed to, or received from, participants in the communication that are affiliated with different (and multiple) entities (e.g., different enterprises, individuals, etc.). Moreover, participants may be added or removed from these chains of communications at almost any point during these chains of communications.

As a result of this complexity, as well as the more general design of such communications and platforms for such communications, it is extremely difficult to track topics related to such communications, especially as such topics may evolve, be added, or removed, be resolved, etc., as the communication chain continues. For example, typical email communications involve many participants and a long chain of discussions. Many times, key topics and questions those are actual purpose of email, remains open with no conclusion. It becomes difficult to track the open items and hence not enough emphasis is put on driving the email discussion towards any type of conclusion. Similarly, during a chat (e.g., with multiple participants), many times key topics, and questions those are purpose of chat remains open with no conclusion. It becomes difficult to track the open items within a long chat. Thus, as with email, not enough emphasis is put on driving discussion towards conclusion. Similar issues exist in other communication channels such as collaboration platforms or the like.

What is desired therefore, are systems and methods for tracking topics related to communications, and in particular what is desired are systems and methods for tracking topics related to communications for use with multiple channels of electronic communication and across different communication platforms for those channels.

SUMMARY

To continue elaborating on the above referenced problems and desires, as discussed, enterprise environments have been steadily growing more complicated, encompassing an ever-expanding number of communication channels and platforms such as email, content collaboration platforms, and multiple types of chat services (e.g., chatbots, enterprise (inter-office) messaging services, collaboration services, instant messengers, etc.).

Each of these communication channels may, additionally, have multiple applications which allow access to that channel. For example, email may be accessed through a number of applications (e.g., Microsoft® Outlook®, Gmail®, etc.) which may, themselves be accessed through different channels (e.g., through a desktop application, through a browser based interface) hosted locally within an enterprise or hosted remotely from an enterprise (e.g., in the cloud or more generally through a third party provider). Complicating this situation even further, participants in a communication chain may not be confined to a particular entity. As a result of this complexity, as well as the more general design of such communications and platforms for such communications, it is extremely difficult to track topics related to such communications, especially as such topics may evolve, be added, or removed, be resolved, etc., as the communication chain continues.

What is desired therefore, are systems and methods for tracking topics related to communications, and in particular what is desired are systems and methods for tracking topics related to communications for use with multiple channels of electronic communication and across different communication platforms for those channels.

Specifically, users or participants in a communication chain may be desired when initiating or participating in a communication such as an email, chat, content collaboration, etc., to track open topics that need participants focus. These topics could be, for example, in the form of questions, tabular information where each row can be a unit of information, statements (e.g., intended to be used for some analysis, or another custom type). Additionally, users would like to create those topics or questions or set of information that needs to be concluded. They would also like to close those topics that have satisfactory conclusions, to show the count of open items or have some indication so that the count is easily visible for all participants. This can help drive discussions towards conclusion of open topics.

To those ends, among others, embodiments of systems and methods for cross platform topic tracking are disclosed herein. Specifically, embodiments of such systems and methods may allow topics (including associated data such as status, notes, etc., associated with a topic) to be independently tracked and manipulated with respect to a chain of communications substantially regardless of the communication platform through which the communications of the chain are accessed or created or the communication channel utilized for the communication.

In some embodiments, the topic management system may have a user interface (e.g., in association with a communication platform), a service that can be utilized by different communication platforms or other applications, a database (e.g., for storing topics for communication chains or other data) and an Artificial Intelligence (AI) based module. A user may use the interface to create a set of topics for a given communication or collaboration. For example, while composing a communication or chat, a user may create a topic from the existing information. At any later stage, a user can close a given topic if that is concluded and participants in the communication chain can see if a given topic is open and all associated information. A number of open items count can be shown in a communication platform (e.g., email, chat application) against a given communication so that users are aware that there are open topics. Users may also be able to access all topics with a single click without searching for a specific communication. Additionally, the AI based module may enable smart topic management minimizing manual management especially used in AI assisted chatbots or other AI based applications. Moreover, a user may be able to retrieve a list of topics associated with a given communication and compare it with other topics to know the similarity index between two communications.

Thus, embodiments may provide the ability to create a set of topics for a given communication or collaboration. For example, while composing a communication or chat, a user can create a topic and manage topic states (e.g., open, Closed, Escalated etc.). Users can also access all topics with a single click without searching for a specific email, chat communication etc., and can create topics of certain types along with custom types to meet their requirements. They may also be able to utilize smart or automatic topic management using AI assisted technology (e.g., be able to find a similarity index between different communications or the like).

Accordingly, embodiments may have a wide variety of applicability in different contexts. For example, embodiments may be useful in association with email applications, different chat applications or any content collaboration tools in general. In particular, embodiment may have wide application where users need to effectively track the key topics of discussion and drive discussion towards purposeful conclusions. Certain contexts include, customer facing chat bots to improve customer satisfaction, as summarization techniques for different communications where key topics can represent the summary, or enterprise level team collaboration tools and applications to optimize the effectiveness of customer experiences (CX).

These, and other aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
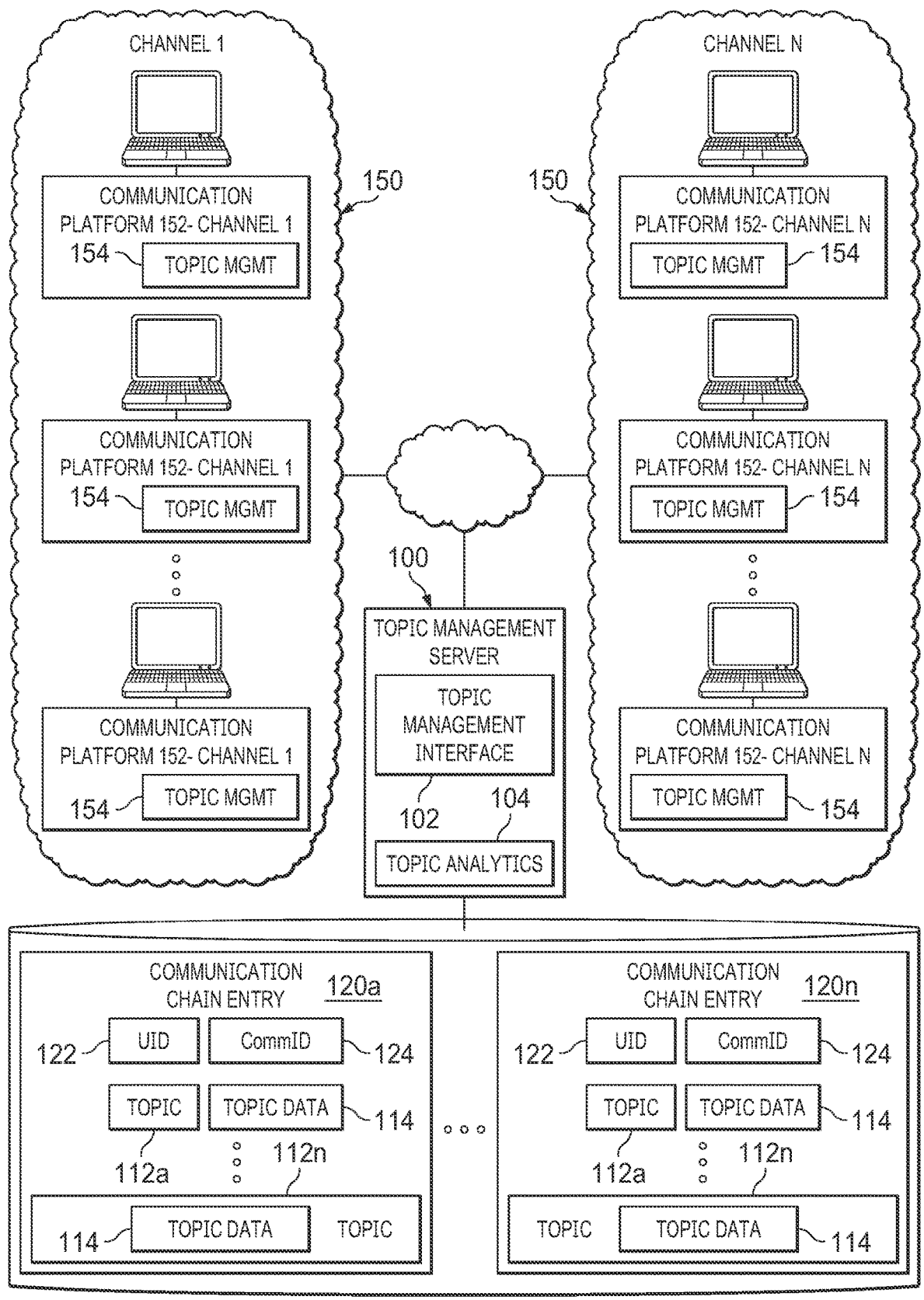
FIG. 1 is a diagrammatic representation of an architecture of a distributed enterprise environment including one embodiment of a topic management system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in more detail, it may be helpful to discuss some useful context. As discussed, enterprise environments have been steadily growing more complicated, encompassing an ever-expanding number of communication channels and platforms such as email, content collaboration platforms, and multiple types of chat services (e.g., chatbots, enterprise (inter-office) messaging services, collaboration services, instant messengers, etc.).

Each of these communication channels may, additionally, have multiple applications which allow access to that channel. For example, email may be accessed through a number of applications (e.g., Microsoft® Outlook®, Gmail®, etc.) which may, themselves be accessed through different channels (e.g., through desktop application, through a browser based interface) hosted locally within an enterprise or hosted remotely from an enterprise (e.g., in the cloud or more generally through a third party provider). Complicating this situation even further, in many cases such electronic communication may not be confined to a particular entity. As but one example, emails may be directed to, or received from, participants in the communication that are affiliated with different (and multiple) entities (e.g., different enterprises, individuals, etc.). Moreover, participants may be added or removed from these chains of communications at almost any point during these chains of communications.

As a result of this complexity, as well as the more general design of such communications and platforms for such communications, it is extremely difficult to track topics related to such communications, especially as such topics may evolve, be added, or removed, be resolved, etc., as the communication chain continues. For example, typical email communications involve many participants and a long chain of discussions. Many times, key topics, and questions those are actual purpose of email, remains open with no conclusion. It becomes difficult to track the open items and hence not enough emphasis is put on driving the email discussion towards any type of conclusion. Similarly, during a chat (e.g., with multiple participants), many times key topics, and questions those are purpose of chat remains open with no conclusion. It becomes difficult to track the open items within a long chat. Thus, as with email, not enough emphasis is put on driving discussion towards conclusion. Similar issues exist in other communication channels such as collaboration platforms or the like.

What is desired therefore, are systems and methods for tracking topics related to communications, and in particular what is desired are systems and methods for tracking topics related to communications for use with multiple channels of electronic communication and across different communication platforms for those channels.

To those ends, among others, attention is now directed to embodiments of systems and methods for cross platform topic tracking disclosed herein. Specifically, embodiments of such systems and methods may allow topics (including associated data such as status, notes, etc., associated with a topic) to be independently tracked and manipulated with respect to a chain of communications substantially regardless of the communication platform through which the communications of the chain are accessed or created.

Looking at FIG. 1, an example of a distributed networked computer architecture including one embodiment of just such a topic management system is depicted. Here, there may be a number of communication channels 150. Each communication channel 150 may be for communication using a different type of electronic communication. For example, one communication channel 150 may be an email channel whereby users can communicate with one another using email, another type of communication channel may be a messaging communication channel such as a chat (e.g., Slack or the like). Another communication channel may be a content collaboration platform whereby users may collaborate on, or access, the same document or communicate through the content collaboration platform. Other types of communication channels 150 will be understood by those of ordinary skill in the art and are fully contemplated herein.

Each of these communication channels 150 may allow electronic communications of that channel 150 to be accessed using a communication platform 152 for that communication channel 150. These communication platforms 152 may be of different types or from different providers or accessible through different devices or applications. For example, a communication platform 152 for email may include Outlook® on a Microsoft® Windows® machine, an email app on an Apple® iPhone®, or a browser based Gmail® application on any device that supports a browser. Communication platforms 152 for email or other communication channels 150 will be understood by those of ordinary skill in the art and are fully contemplated herein.

A topic management system may be provided, where that topic management system may be independent of the communication channels 150 or communication platforms 152 through which communications on a particular channel are accessed (e.g., created, updated, responded to, etc.). This topic management system may include a topic management server 100 (e.g., deployed in a cloud computing platform) and a client side topic management component 154. The topic management server 100 provides a topic management interface 102 through which the functionality of the topic management server 100 may be accessed. This topic management interface 102 may be a service (e.g., or microservice) accessed through a web services interface (e.g., a RESTful interface) or the like, may be an Application Programming Interface (API) or may be another type of interface altogether.

The client side topic management component 154 may be integrated with, or accessed by, communication platforms 152 for accessing communications in a channel 150. For example, the client side topic management component 154 may be a plug-in for the communication platform 152 (e.g., may be a plug-in of a browser or other application used as a communication platform 152) or may be native (e.g., part of the code or, or a library access by) to the communication platform 152.

In one embodiment, the client side topic management component 154 may be configured with a default address or proxy address associated with the topic management system. In this manner, the same client side topic management component 154 for each communication channel or each communication platform may be configured with the same address (e.g., proxy address). The operators associated with the topic management system can then provide a server or other logic at the proxy address (e.g., redirect or other service) such that any communication received from the client side topic management component 154 or intended for the proxy address with which the client side topic management component 154 is configured can be directed according to the desires of the operators.

For example, communications can be redirected to topic management server 100 (e.g., the interface of the topic management server 100), or one of many topic management server 100, or a topic management server 100 specific to a communication channel or platform. Such a configuration also allows the operators of the topic management platform to configure the topic management server 100 and associated architectures, implementations, or deployments in whatever manner they choose substantially without altering the configuration of the client side topic management component 154.

The client side topic management component 154 may offer a user interface through which a user accessing a communication (e.g., using the communication platform 152) may create or update a topic associated with a communication being accessed, including updating topic data associated with the topic. This topic data may include a name, definition or description of the topic, a status of the topic (e.g., a completion status), notes about the topic or almost any other data related to the topic.

Thus, when a user at a communication platform 152 decides to (e.g., initially) create a communication in the channel 150, the client side topic management component 154 may notify (e.g., send a request through topic management interface 102) the topic management server 100 that a communication is being created (e.g., in the communication channel 150). The topic management server 100 may then create an identification for the communication being created (e.g., the email, chat session, etc.). This identifier may be a unique identifier (UID), such as a Globally Unique IDentifier (GUID) or the like. This UID may be returned (e.g., through the topic management interface 102) to the requesting client side topic management component 154.

Additionally, when such a request is received by the topic management server 100 may create an entry 120 for the communication (and any resulting communication chain associated with the communication) in the data store 170. The communication chain topic entry 120 may be associated with the UID 122 created for the communication by the topic management server 100.

As the user using the communication platform 152 interacts with the user interface (e.g., provided by the client side topic management component 154 or through the topic management server 100) to create or update topics associated with a communication being accessed, including updating topic data associated with the topic, the client side topic management component 154 may notify the topic management server 100 of each topic and topic data associated with the topic. Specifically, the client side topic management component 154 may send a request through topic management interface 102 with the topic data (e.g., the topic and any association notes, status, etc.), where the request includes or is otherwise associated with the UID 122 for the communication.

When such a request is received by the topic management server 100, the topic management server 100 may update the entry 120 for the communication associated with the UID 122 with the topic 112 and associated topic data 114 specified by the request. This topic data 114 may include a name, definition or description of the topic, a status of the topic (e.g., a completion status), notes about the topic or almost any other data related to the topic. Thus, the entry 120 for the communication may be updated to include each topic 112 and associated topic data 114 specified by users in association with the communication and such topics 112 and topic data 114 may be tracked by the topic management system. As can be seen in this context, as a UID 122 generated for a communication (or chain) may be used at the beginning of a communication chain, topics 112 may be created, edited, updated, etc., even in advance of the sending of an initial communication in a communication chain.

At some point then, a user interacting with a communication platform 152 (e.g., to create an initial communication) will actually send the communication to one or more recipients. When this happens the communication platform 152 may generate a communication identifier (comm id). A communication identifier is, in embodiments, a unique identifier created for a communication by the communication platform in accordance with identifiers used by the communication channel. For example, when the communication channel 150 is email, the communication identifier may be a message-ID or the like.

This communication identifier generated for the sent communication can then be obtained by the client side topic management component 154 at the communication platform 152 being used to generate the communication when the communication is sent. The communication identifier for the communication can then be sent to the topic management server 100. Specifically, the client side topic management component 154 may send a request through topic management interface 102 with the communication identifier 124, where the request includes, or is otherwise associated with the UID 122 for the communication.

When such a request is received by the topic management server 100, the topic management server 100 may update the entry 120 for the communication associated with the UID 122 with the communication identifier 124 specified by the request.

Once the communication is sent by the user, one or more recipients of the communication can then access the communication through an associated communication platform 152 for the communication channel 150. This communication platform 152 may, for example, be the same or different communication platform 152 as the communication platform 152 utilized by other users to create or access the communication. For example, a communication platform 152 such as Microsoft® Outlook® may be used to create an email message while a browser based Gmail® application may be used by a recipient to access the email.

When a recipient access the communication through the communication platform 152, the client side topic management component 154 may obtain the communication identifier 124 for the communication through the communication platform 152 and send a request through topic management interface 102 with the communication identifier 124, where the request requests topics 112 and topic data 114 associated with the communication identifier 124.

When such a request is received by the topic management server 100, the topic management server 100 may access the entry 120 for the communication associated with the communication identifier 124 specified by the request. The topic management server 100 can then return the associated topics 112 and topic data 114 to the requesting client side topic management component 154.

In some embodiments, the topic management server 100 may also include a topic analytics engine 104 to recommend topics or topics data to include with topics 112 or topic data 114 returned. Such recommendations may be based on data within the entry 120 for the communication chain or may be based on other data, such as an analysis of the communication chain (e.g., where data for the communication chain may be provided by the client side topic management component 154 from, for example, an analysis of the communication chain being accessed). Such a topic analytics engine 104 may analyze (e.g., employing artificial intelligence techniques such as machine learning or the like) communications (e.g., within or across communication channels) to generate topics for suggestion or to classify or group existing topics, to generate data for topic data such as attributes, classifications, or groups, or suggest possible recipients or data (e.g., content such as documents or the like) for inclusion in a communication chain. Such analysis may be made on various attributes of communications, such as recipients or participants in a communication chain, data included in a communication, keywords or subjects of such communication, or other communication parameters or attributes. These recommended topics or topic data may also be returned in response to a request by the client side topic management component 154 and identified as recommended in the response by the topic management system 100.

The client side topic management component 154 can then present the returned topics 112 and associated topic data 114 through its user interface as the user (e.g., recipient) is accessing the communication (e.g., using the communication platform 152). Recommended topics or topic data may also be presented and identified to the user in such an interface.

Using this interface, the user can then create new topics, or edit or add to the exiting topics 112 and topic data presented in the interface. As the user access (e.g., creates, edits, updates, etc.) the topics and topic data, the topics and topic data associated with the communication chain (e.g., in the communication chain entry 120) may be updated at the topic management server in association with the communication chain in a similar manner as described above.

In particular, the client side topic management component 154 may send a request through topic management interface 102 with the topic data (e.g., the topic and any association notes, status, etc.), where the request includes or is otherwise associated with the communication identifier 124 for the communication chain (e.g., as obtained from the communication platform 152). When such a request is received by the topic management server 100, the topic management server 100 may update the entry 120 for the communication associated with the communication identifier 124 with the topic 112 and associated topic data 114 specified by the request from the client side topic management component 154.

Figure 2:
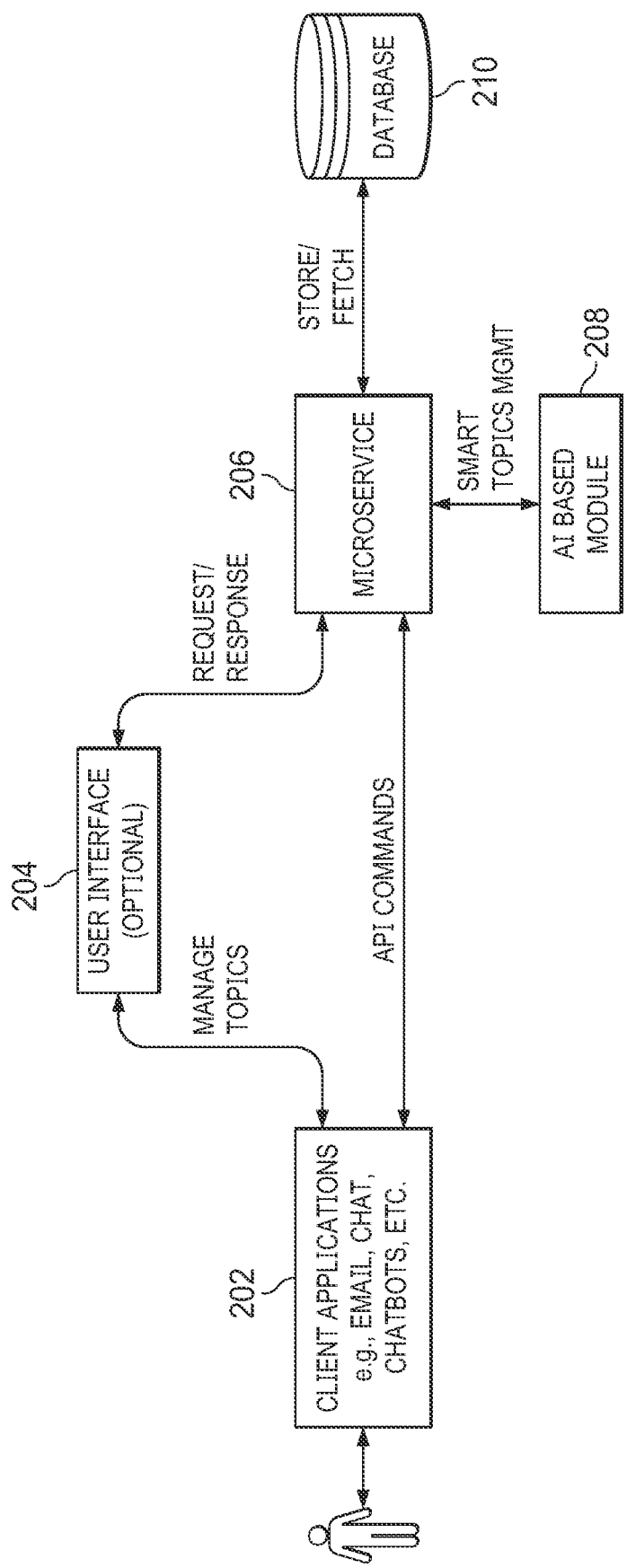
FIG. 2 is a diagrammatic representation of an architecture of one embodiment of a topic management system.

Moving to FIG. 2, one embodiment of an architecture that may be utilized for a topic management system is depicted. Here, the topic management system can include an optional user interface 204, a (micro)service 206, an artificial intelligence (AI) based module 208 that may be used for recommendations or the like, and a database 210.

According to this embodiment of the architecture, a user may interface with a communication platform 202 (e.g., client application for email, chat, chatbot, etc.) to access communications. The user may access (e.g., manage) topics in association with the communication using user interface 204, including creating, reading, updating, deleting, etc., topics via the user interface that may be provided by a client side topic management component user interface. Service 206 may offer a number of service interfaces for topic management (e.g., through a service 206 that may be utilized by the client side topic management component or an interface of the client side topic management component) or an API that may be accessed directly by communication platforms or client side topic management component or other applications that may desire topic management. In some cases, this API may allow services 206 to be invoked directly through an API call.

The client side component may thus utilize a request and response architecture (e.g., web services) to interface with service 206 (e.g., microservice) to serve the requests associated with such topic management. AI module 208 may assist in the automatic management or recommendation of topics or associated data and may be utilized in the servicing of requests to service 206. Database 210 can be a database (e.g., a distributed) database that stores mappings of communication identifiers and topics with other topic data such as metadata, contexts of chats, categories or attributes, etc. In some embodiments of the architecture for a topic management system, the service 206, database 210 and AI module 208 may be deployed in a containerized environment (e.g., Docker/Kubernetes) so they are scalable, highly available and fault tolerant.

Some examples of contexts where embodiments of such an AI module 208 may be useful in a topic management system may be helpful. As but one example, suppose an insurance marketing manager would like to know the list of topics that are interesting to a maximum number of customers. Here, an AI based module integrated to chatbots or customer email/ticketing system, can automatically detect the topics and create them for given customer communications. Later, this data can be used for different analysis as stated in the use case.

As another example, a marketing campaign manager may desire to track the user activities, interests, feedback etc., on web sites. In this case, an AI based module integrated to backend web servers can capture user activities, interests, feedback etc., on web sites. Later these can be converted to key topics saved into the system and used for different analysis as stated in the use case.

As still another example, a customer communications manager may desire to track the effectiveness of an email customer communication by receiving suggestions to improve them. In this case, an AI based module integrated to customer ticketing system or customer call center, can automatically detect the topics, and create them for given customer communications. Later, such an AI module can give relevant suggestions to improve them by highlighting the number of days elapsed, missing information, reasons of delay etc. This information (topics and relevant suggestions) can act as knowledge repository for further communication improvements.

Figure 3:
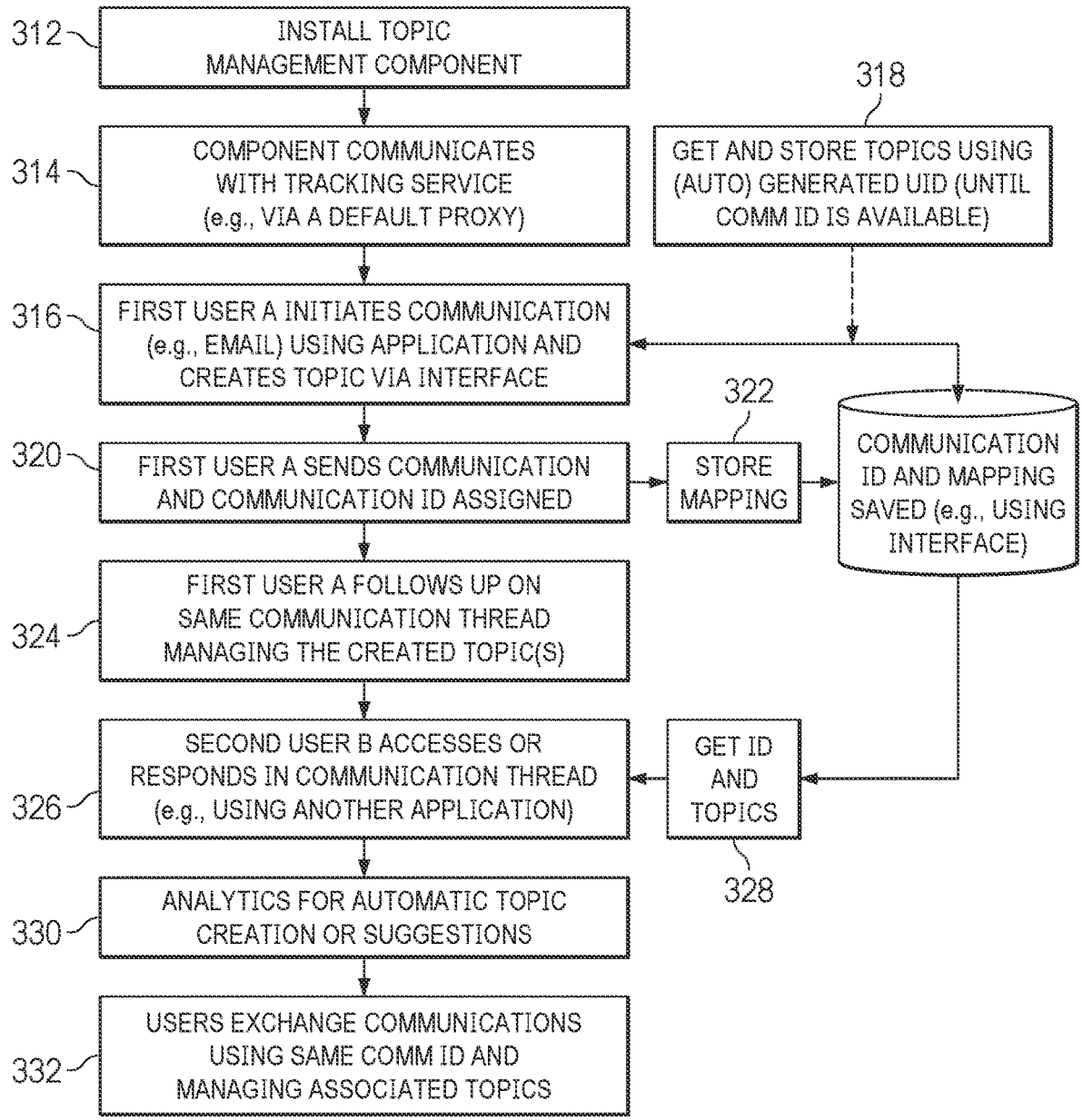
FIG. 3 is a flow diagram of one embodiment of a method of operation of an embodiment of a topic management system.

Referring now to FIG. 3, a flow diagram of the example operation of a topic management system according to one embodiment is presented. This topic management system may be used to manage topics for communications sent (And received) via one or more of a plurality of (e.g., different types of) communication channels such as an email channel, a messaging communication channel such as a chat, a content collaboration platform or another type of communication channel. Each of these communication channels may allow electronic communications of that channel to be accessed using a communication platform for that communication channel, where those platforms may be of different types or from different providers, or accessible through different devices or applications.

A topic management system may be provided, where that topic management system may be independent of the communication channels or communication platforms through which communications on a particular channel are accessed (e.g., created, updated, responded to, etc.). This topic management system may include a topic management server (e.g., deployed in a cloud computing platform) and a client side topic management component.

Accordingly, a topic management component may be installed. (STEP 312). This component may be a client side topic management component integrated with, or accessed by, communication platforms for accessing communications in a channel. For example, the client side topic management component may be a plug-in for a communication platform (e.g., may be a plug-in of a browser or other application used as a communication platform such as Outlook® or the like) or may be native (e.g., part of the code or, or a library access by) to a communication platform.

This topic management component may communicate with the topic management system using a proxy address or the like configured at the topic management component. (STEP 314). In some cases, a topic management server provides a topic management interface through which the functionality of the topic management system may be accessed. This topic management interface may be a service (e.g., or microservice) accessed through a web services interface (e.g., a RESTful interface) or the like, may be an Application Programming Interface (API) or may be another type of interface altogether.

In one embodiment, then, the client side topic management component may be configured with a default address or proxy address associated with the topic management system. In this manner, the same client side topic management component for each communication channel or each communication platform may be configured with the same address (e.g., proxy address). The operators associated with the topic management system can then provide a server or other logic at the proxy address (e.g., redirect or other service) such that any communication received from the client side topic management component or intended for the proxy address with which the client side topic management component is configured can be directed according to the desires of the operators.

For example, communications can be redirected to a topic management system (e.g., the interface of the topic management server), or one of many topic management server, or a topic management server specific to a communication channel or platform. Such a configuration also allows the operators of the topic management platform to configure the topic management server and associated architectures, implementations, or deployments in whatever manner they choose substantially without altering the configuration of the client side topic management component.

At some point then, a user may initiate a communication using a communication platform (STEP 316). For example, a user may use a browser and access an email provider (e.g., Gmail®) to create an email or may access a communication application (e.g., Outlook®) to create such a communication. The client side topic management component associated with the communication platform (e.g., a plug-in of a browser or application through which the communication is generated) may offer a user interface through which a user accessing a communication (e.g., using the communication platform) may create or update a topic associated with a communication being accessed, including updating topic data associated with the topic. This topic data may include a name, definition or description of the topic, a status of the topic (e.g., a completion status), notes about the topic or almost any other data related to the topic.

Thus, when a user at a communication platform decides to (e.g., initially) create a communication in the channel, the client side topic management component may notify (e.g., send a request through a topic management interface) the topic management server that a communication is being created (e.g., in the communication channel) (STEP 318). The topic management server may then create an identification for the communication being created (e.g., the email, chat session, etc.). This identifier may be a unique identifier (UID), such as a Globally Unique IDentifier (GUID) or the like. This UID may be returned (e.g., through the topic management interface) to the requesting client side topic management component.

Additionally, when such a request is received the topic management server may create an entry for the communication (and any resulting communication chain associated with the communication). The communication chain topic entry may be associated with the UID created for the communication by the topic management server.

As the user using the communication platform interacts with the user interface (e.g., provided by the client side topic management component or through the topic management server) to create or update topics associated with a communication being accessed, including updating topic data associated with the topic, the client side topic management component may notify the topic management server of each topic and topic data associated with the topic. Specifically, the client side topic management component may send a request through topic management interface with the topic data (e.g., the topic and any association notes, status, etc.), where the request includes or is otherwise associated with the UID for the communication.

When such a request is received by the topic management server, the topic management server may update the entry for the communication associated with the UID with the topic and associated topic data specified by the request. This topic data may include a name, definition or description of the topic, a status of the topic (e.g., a completion status), notes about the topic or almost any other data related to the topic.

Thus, the entry for the communication may be updated to include each topic and associated topic data specified by users in association with the communication and such topics and topic data may be tracked by the topic management system. As can be seen in this context, as a UID generated for a communication (or chain) may be used at the beginning of a communication chain, topics may be created, edited, updated, etc., even in advance of the sending of an initial communication in a communication chain.

At some point then, a user interacting with a communication platform (e.g., to create an initial communication) will actually send the communication to one or more recipients (STEP 320). When this happens the communication platform may generate a communication identifier (comm id). A communication identifier is, in embodiments, a unique identifier created for a communication by the communication platform in accordance with identifiers used by the communication channel. For example, when the communication channel is email, the communication identifier may be a message-ID or the like.

This communication identifier generated for the sent communication can then be obtained by the client side topic management component at the communication platform being used to generate the communication when the communication is sent. The communication identifier for the communication can then be sent to the topic management server (STEP 322). Specifically, the client side topic management component may send a request through topic management interface with the communication identifier, where the request includes, or is otherwise associated with the UID for the communication. When such a request is received by the topic management server, the topic management server may update the entry for the communication associated with the UID with the communication identifier specified by the request. The first user can then perform follow ups or responses associated with that initial communication (i.e., the communication thread) and manage associated topics using that communication identifier (STEP 324).

Once the communication is sent by the first user, one or more recipients (second users) of the communication can then access the communication through an associated communication platform for the communication channel (STEP 326). This communication platform may, for example, be the same or different communication platform as the communication platform utilized by other users to create or access the communication. For example, a communication platform such as Microsoft® Outlook® may be used to create an email message while a browser based Gmail® application may be used by a recipient to access the email.

When a recipient access the communication through the communication platform, the client side topic management component associated with the user's access to the communication platform (e.g., a client side topic management component installed in association with a user's browser or application for accessing the communication platform) may obtain the communication identifier for the communication through the communication platform. The client side topic management component can send a request through interface of the server with the communication identifier, where the request requests topics and topic data associated with the communication identifier (STEP 328).

When such a request is received by the topic management server, the topic management server may access the entry for the communication associated with the communication identifier specified by the request. The topic management server can then return the associated topics and topic data to the requesting client side topic management component (STEP 328). In this manner, user may exchange further communications sharing the same communication identifier to track and manage associated topics and their associated states.

Additionally, in some embodiments a topic analytics engine may recommend topics or topics data to include with topics or topic data returned (STEP 330). Such recommendations may be based on data within the entry for the communication chain or may be based on other data, such as an analysis of the communication chain (e.g., where data for the communication chain may be provided by the client side topic management component from, for example, an analysis of the communication chain being accessed).

Such a topic analytics engine may analyze (e.g., employing artificial intelligence techniques such as machine learning or the like) communications (e.g., within or across communication channels) to generate topics for suggestion or to classify or group existing topics, to generate data for topic data such as attributes, classifications, or groups, or suggest possible recipients or data (e.g., content such as documents or the like) for inclusion in a communication chain. Such analysis may be made on various attributes of communications, such as recipients or participants in a communication chain, data included in a communication, keywords or subjects of such communication, or other communication parameters or attributes. These recommended topics or topic data may also be returned in response to a request by the client side topic management component and identified as recommended in the response by the topic management system.

The client side topic management component can then present the returned topics and associated topic data through its user interface as the user (e.g., recipient) is accessing the communication (e.g., using the communication platform). Recommended topics or topic data may also be presented and identified to the user in such an interface.

Using this interface, the user can then create new topics, or edit or add to the exiting topics and topic data presented in the interface. As the user access (e.g., creates, edits, updates, etc.) the topics and topic data, the topics and topic data associated with the communication chain (e.g., in the communication chain entry) may be updated at the topic management server in association with the communication chain in a similar manner as described above.

In particular, the client side topic management component may send a request through topic management interface with the topic data (e.g., the topic and any association notes, status, etc.), where the request includes or is otherwise associated with the communication identifier for the communication chain (e.g., as obtained from the communication platform). When such a request is received, the entry for the communication associated with the communication identifier may be updated with the topic and associated topic data specified by the request from the client side topic management component.

As but one example, the following pseudocode illustrates embodiments of the operations of various components and steps of embodiments as discussed herein.

```
Client applications side:
    topicPluginHandle handle = createInstance ("plugin-
    name);
    handle.removeReference( ); // reference will be
    decremented by 1. Plugin will be
    //unloaded if there are zero references within client
    application
Operations while plugin loaded:
    handle.connecttoProxy( ); //ignoring error codes for
    now
    array[topicIds] = handle.createTopics(array[topics]);
    //create a set of topics //provided within an array
    and returns their ids
    handle.removeTopics(array[topic ids]);//remove a set
    of topics
    handle.updateTopic(topic id, updateString);
Plugin to backend communication:
    POST(Headers, COMUID, Topics);// REST calls to
    Microservice to update
    GET(Headers, COMUID, Topics); );// REST calls to
    Microservice to retrieve
Microservice operations:
    //Below calls would result in respective DB
    calls/queries.
    UpdateDB(COMUID, array[topics]);
    RemoveTopic(COMUID, topicid);
    RemoveCom(COMUID);
    Array[topics]=RetreiveTopic(COMUID );
    AIHandler* handle = InstallAIHandler(interfaceUID);
    handle.subscribeToEvents(EventType); //EventType=
    Create, Update, Remove
    handle.unsubscribe(EventType);
    UnloadAIhandler(interfaceUID);
    handle=NULL;
```

Figure 4A:
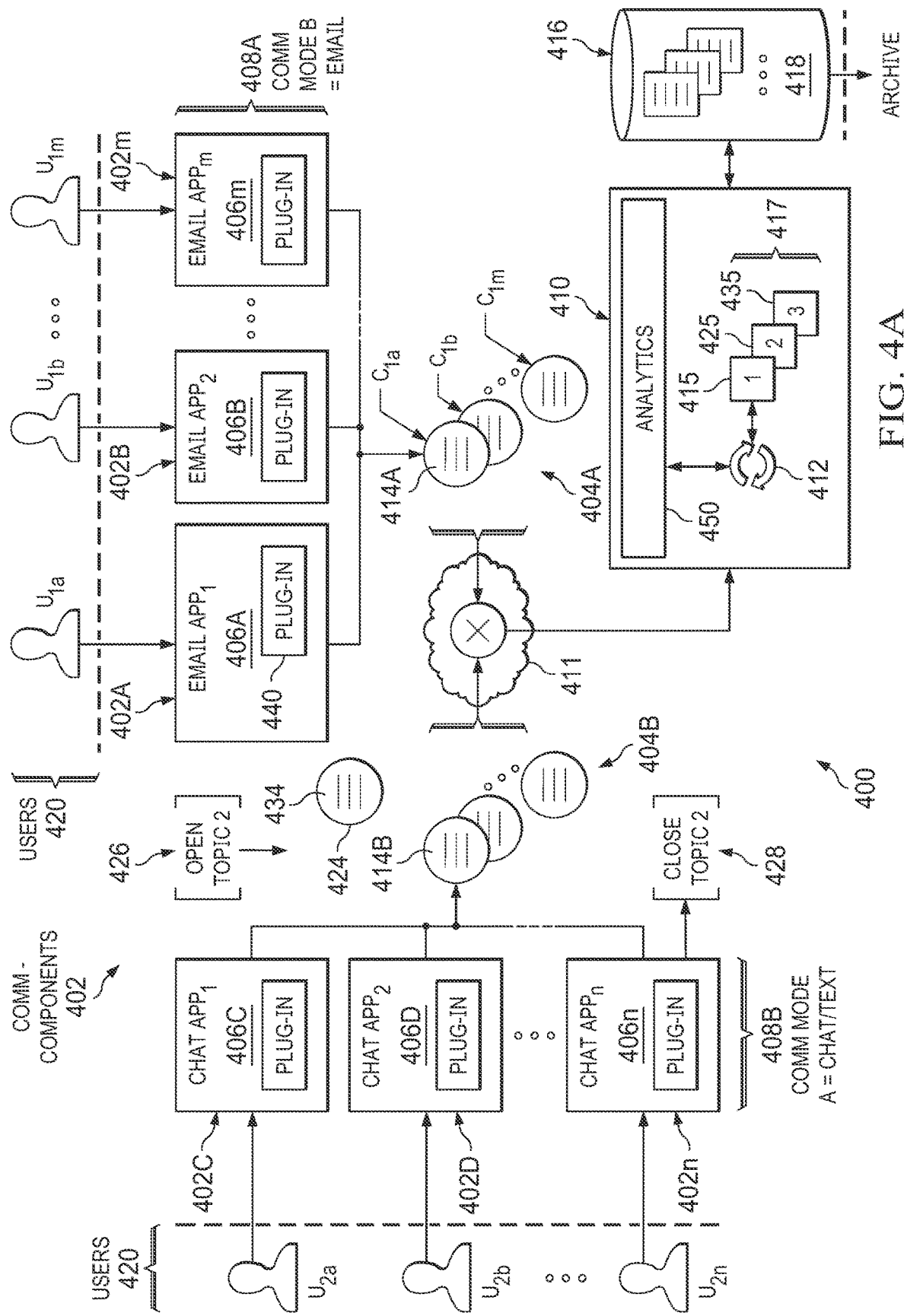
FIGS. 4A and 4B are a diagrammatic representation of an architecture of a distributed enterprise environment including one embodiment of a topic management system.

Looking now to FIG. 4A, a non-limiting embodiment 400 of a topic generation system, method, or approach comprises a plurality of communication components 402 (non-limiting examples of which comprise communication component 402A, 402B, 402C, 402D, 402m, and 402n), each communication component 402 associated with a plurality of communications (referred to generally by reference numerals 404A and 404B) at one or more client devices (non-limiting examples of which comprise 406A, 406B, 406C, 406D, 406m and 406n) and characterized by one of a plurality of communication modes (non-limiting examples of which include communication mode A, reference numeral 408A, and communication mode B, reference numeral 408B). A topic generation component 410 is coupled to the communication components 402 over a network 411. The topic generation component 410 generates (represented by symbol at reference numeral 412) a plurality of topics 417 (three example topics represented by reference numerals 415, 425, and 435) using the plurality of communications (404A, 404B) from each of the communication components 402 and based on communication attributes (non-limiting examples of which comprise attributes at 414A and 414B) of the plurality of communications 404A and 404B). Storage component 416 is coupled to the topic generation component 410, the storage component storing the plurality of topics 417.

Referring now to FIG. 4B and again to FIG. 4A, in the non-limiting embodiment 400, each of the plurality of topics 417 (one such topic, topic 1, is referred in FIGS. 4A and 4B as reference numeral 415) comprises a unique topic id 415A, a set of user ids 415B, each user id unique to a user (generally represented by reference numeral 420) collaborating on each topic (such as topic 415), a portion of the communication attributes 415C, the portion of communication attributes 415C used to generate each topic 415, a topic subject 415D defining the subject of each topic 415, one of the plurality of communication modes 408A and 408B, defining a topic mode 415E for each topic, and a plurality of topic communications 415F comprising a subset of the plurality of communications 404A and 404B. Topic 1 415, in a non-limiting example, includes users U1*a*, U1*b* and Ulm, and topic communications C1*a*, C1*b* and C1m. It should be noted that topic 1 415 may include any number of users 420 and communications 404A, 404B. Moreover, topic generation system 400 may generate topics 415, 425 and 435 or any number of topics 417.

Figure 4B:
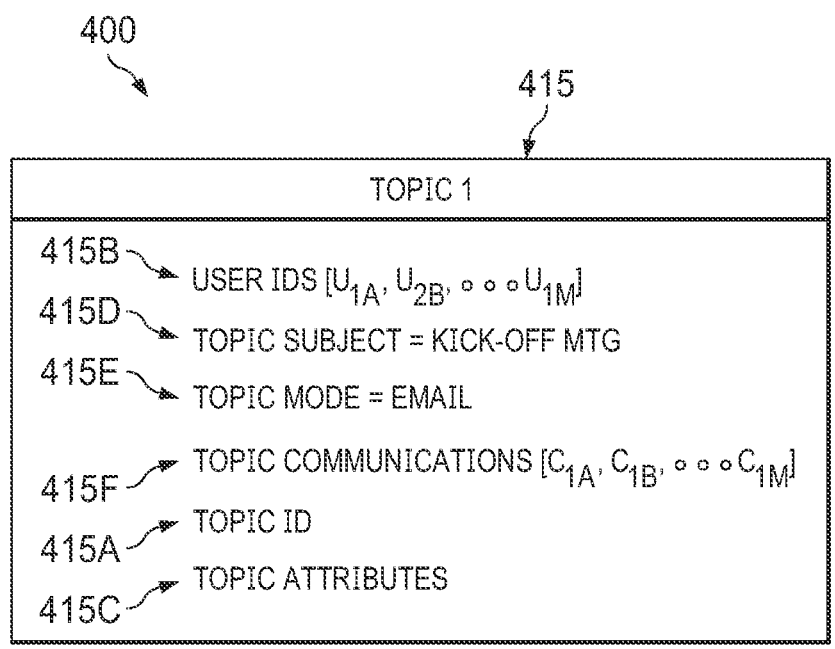

In a non-limiting example depicted in FIGS. 4A and 4B, topic 1 415 includes users 415B U1*a*, U1*b* and Ulm (a subset of users 420) on client devices 406A, 406B and 406*m* respectively, and involves topic communications 415F (C1*a*, C1*b*, and C1*m*), a subset of plurality of communications 404A. Here, the topic id 415A is a unique number, topic attributes 415C includes a set of values (explained herein below), a topic subject 415D equal to a text value "KICK-OFF MEETING", and the topic mode 415E. In this example, topic mode 415E is "EMAIL".

In a further embodiment, the topic generation component 410 receives a new communication 424 and updates the plurality of topic communications 415F for one of the topics (here topic 1 415) based on attributes 434 of the new communication 424.

In another embodiment, the topic generation component 410 receives an open topic command 426 from one of the client devices (in the example, 406C) to open a new topic and, in response, generates one of the topics (here topic 2 425), the storage component 416 storing the generated one of the topics 425. Further, topic generation component 410 receives a close topic command 428 from a client device (in this example, 406*n*) to close the generated one of the topics and, in response, deletes the generated one of the topics 425. The storage component 416 archives the closed one of the topics 425. Archiving refers to an external storage for storing deleted topics 425 such that they may be recalled for any number of purposes, including but not limited to auditing, topic communications retracing, compliance, and/or communications management and communications recall.

In still a further embodiment, topic generation system 400 includes one or more plug-ins (one example of which is represented by reference numeral 440) for a communication mode, such as 408A or 408B. Still further, the plug-in 440 may be designed for use with a specific client device communication application, such as chat application, email application, and/or video application. Each plug-in 440 may be designed to simulate the look and feel, programmatic, and/or scripting characteristics of a specific client application, such as client application 406A. In yet another embodiment, the plurality of communication modes 408A and 408B comprises chat, email, and video, and the corresponding plug-in 440 to the one communication mode is adapted for receiving user input and distributing user input from and to a user collaborating on one of the topics 417 over the one communication mode.

In a further embodiment, topic generation system 400 includes a topic analytics component 450, coupled to the topic generation component 410. The topic analytics component 450 analyzes the plurality of communications 404A and 404B to generate one of the topics (for example, topic 1 415) and derives the topic subject 415D and the portion of communication attributes 414A and 414B for the one generated topic 415. In a non-limiting example, topic analytics component 450 may analyze a set of communications (as in communications 404A and 404B), index the communications, and derive a topic and a subset of communications that are relevant to the topic.

Communication attributes 414A and 414B may include values such as time of communication, length of the communication, communication sentiment, and keywords that help categorize the communication. Attributes may be defined, identified and tracked at a central and/or global level to help piece together communications 404A, 404B and relevant topics 417. The topic analytics component 450 may leverage artificial intelligence and machine learning techniques to classify, index, and normalize communications 404A, 404B to aide in assigning to topics 417. The attributes may be used to further model communications 404A, 404B for each topic to better understand relevancy and subject matter, including, but not limited to, a user's role and responsibilities, team members, and past behaviors. In some embodiments, topics may be templated to reduce overhead, the topic templates used to recognize repeated and/or overlapping topics. Topics may even be associated with projects and tasks related to the topics so that work cycles may be more intelligently and efficiently managed between and among user participants and groups. In some instances, groups of users may be used to help piece together communications 404A, 404B for a topic.

In some embodiments, a topic includes communications 404A, 404B (and topic communications 415F) from the same communication mode 408A, 408A. As discussed above, modes may include any type of communication, such as chat, text messages, emails, video, audio, etc. Topic attributes 415C may include values particular and relevant to a mode, such as an email "to" field and an email "from" field for email. This may aide in assigning topic communications 415F and topic users 415B. It should be noted, however, that some topics 417 may involve more than one mode, either combining one or more modes (such as video and chat), or the mode itself may enable and involve multiple modalities such as video tools that may involve both audio-visual and chat capabilities.

In a non-limiting operation of topic generation system 400, a set of communications between and among a group of users may include repeated reference to a kick-off meeting. A product manager, user U2*a*, may instruct users U2*b* and U2*n* about the desired kick-off meeting. Users U2*b* and U2*n* may acknowledge that they are available for the meeting, and the three users may discuss the meeting agenda and any needed presentation materials. All such communications may occur over email, supported by the email application plug-ins. Alternatively, a new kick-off meeting topic may be opened by the product manager's administrative assistant, define a topic subject, and then add users to the topic discussion. The topic's attributes may be managed by the topic generation component 410 and/or topic analytics component 450 so that relevant communications may be identified, tracked, and added to the topic. Further, the administrative assistant may choose, at an appropriate time, to close the kick-off meeting topic.

Referring again to FIG. 4A, in still a further embodiment, the topic generation component 410 receives a new communication 424, forwards the new communication 424 to the topic analytics component 450, and the topics analytics component 450 identifies one of the topics 417 associated with the new communication 424. Here, the topic analytics component 450 updates the plurality of topic communications (such as 415F) for the identified one of the topics 415 based on attributes of the new communication 434. The topic analytics component 450 may identify the relevant topic 415 by doing a comparison of the new communication attributes 434 and the topic attributes 415C.

In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. A system for topic generation from communications, comprising:
   a topic management server, comprising:
   a processor; and
   a non-transitory computer readable medium, comprising instructions executable on the processor for:
   providing an interface for communicating with a plurality of communication components, each communication component associated with a plurality of communications at one or more client devices and characterized by one of a plurality of communication modes, the plurality of communication components including a first client side topic management component at a first client device and a second client side topic management component at a second client device;
   providing a topic generation component for generating topics using the plurality of communications from each of the plurality of communication components and based on communication attributes of the plurality of communications; and
   providing a storage component coupled to the topic generation component, the storage component storing the topics,
   wherein each of the topics comprises a unique topic identifier (id), a set of user ids, each user id unique to a user collaborating on each topic, a portion of the communication attributes, the portion of communication attributes used to generate each topic, a topic subject defining a subject of each topic, one of the plurality of communication modes defining a topic mode for each topic, and a plurality of topic communications comprising a subset of the plurality of communications, and wherein the instructions are further executable for:
   receiving a notification from the first client side topic management component at the interface, wherein the notification indicates that a first communication is being created at the first client device and the notification was sent from the first client side topic management component before the first communication is sent from the first client device;
   in response to receiving the notification, generating a first communication identifier at the topic management server, and returning the first communication identifier to the first client side topic management component;
   creating a communication chain topic entry associated with the first communication identifier, wherein the communication chain topic entry is associated with one or more of the topics;
   receiving a second communication identifier from the first client side topic management component at the interface, wherein the second communication identifier is associated with the sending of the first communication by a communication platform associated with the first client device and the second communication identifier is sent by the first client side topic management component in association with the first communication identifier;
   associating the communication chain topic entry with the received second communication identifier;
   receiving, at the interface, a request associated with the second communication identifier from the second client side topic management component at the second client device;
   based on the second communication identifier associated with the request, accessing the communication chain topic entry to retrieve the one or more of the topics associated with the communication chain topic entry; and
   returning the one of more of the plurality of topics to the second client side topic management component.

2. The system of claim 1, wherein the topic generation component receives a new communication and updates the plurality of topic communications for one of the topics based on attributes of the new communication.

3. The system of claim 1, wherein the topic generation component:
   receives an open topic command from one of the one or more client devices to open a new topic and, in response, generates one of the topics, the storage component storing the generated one of the topics; and
   receives a close topic command from the one of the one or more client devices to close the generated one of the topics and, in response, deletes the generated one of the topics, the storage component archiving the generated one of the topics.

4. The system of claim 1, wherein each communication mode has a corresponding plug-in installed at the one or more client devices.

5. The system of claim 4, wherein the plurality of communication modes comprises chat, email, and video, and the corresponding plug-in for a communication mode is adapted for receiving user input and distributing user input from and to a user collaborating on one of the topics over the communication mode.

6. The system of claim 1, wherein the instructions are further executable for:
   providing a topic analytics component, coupled to the topic generation component; wherein the topic analytics component:
   analyzes the plurality of communications to generate one of the topics; and
   derives a topic subject and a portion of communication attributes for the one generated topic.

7. The system of claim 6, wherein the topic generation component:
   receives a new communication;
   forwards the new communication to the topic analytics component;
   the topics analytics component identifies one of the topics associated with the new communication; and
   the topic analytics component updates the plurality of topic communications for the identified one of the topics based on attributes of the new communication.

8. A method for topic generation from communications, comprising:

providing an interface at a topic management server for communicating with a plurality of communication components with a plurality of communications, the plurality of communication components characterized by one of a plurality of communication modes, the plurality of communication components including a first client side topic management component at a first client device and a second client side topic management component at a second client device;

generating topics using the plurality of communications from each of the plurality of communication components and based on communication attributes of the plurality of communications; and storing the topics, wherein each of the topics comprises a unique topic identifier (id), a set of user ids, each user id unique to a user collaborating on each topic, a portion of the communication attributes, the portion of communication attributes used to generate each topic, a topic subject defining a subject of each topic, one of the plurality of communication modes defining a topic mode for each topic, and a plurality of topic communications comprising a subset of the plurality of communications;

receiving a notification from the first client side topic management component at the interface, wherein the notification indicates that a first communication is being created at the first client device and the notification was sent from the first client side topic management component before the first communication is sent from the first client device;

in response to receiving the notification, generating a first communication identifier at the topic management server, and returning the first communication identifier to the first client side topic management component;

creating a communication chain topic entry associated with the first communication identifier, wherein the communication chain topic entry is associated with one or more of the topics;

receiving a second communication identifier from the first client side topic management component at the interface, wherein the second communication identifier is associated with the sending of the first communication by a communication platform associated with the first client device and the second communication identifier is sent by the first client side topic management component in association with the first communication identifier;

associating the communication chain topic entry with the received second communication identifier;

receiving, at the interface, a request associated with the second communication identifier from the second client side topic management component at the second client device;

based on the second communication identifier associated with the request, accessing the communication chain topic entry to retrieve the one or more of the topics associated with the communication chain topic entry; and returning the one of more of the topics to the second client side topic management component.

9. The method of claim 8, further comprising receiving a new communication and updating the plurality of topic communications for one of the topics based on attributes of the new communication.

10. The method of claim 8, further comprising:
receiving an open topic command from one of the one or more client devices to open a new topic and, in response, generating and storing one of the topics; and
receiving a close topic command from the one of the one or more client devices to close the generated one of the topics and, in response, deleting the generated one of the topics and archiving the generated one of the topics.

11. The method of claim 8, wherein each communication mode has a corresponding plug-in installed at one or more client devices.

12. The method of claim 11, wherein the plurality of communication modes comprises chat, email, and video, and the corresponding plug-in for a communication mode is adapted for receiving user input and distributing user input from and to a user collaborating on one of the topics over the communication mode.

13. The method of claim 8, further comprising:
analyzing the plurality of communications to generate one of the topics; and
deriving a topic subject and a portion of communication attributes for the one generated topic.

14. The method of claim 13, further comprising:
receiving a new communication;
forwarding the new communication to a topic analytics component;
identifying one of the topics associated with the new communication; and
updating the plurality of topic communications for the identified one of the topics based on attributes of the new communication.

15. A non-transitory computer readable medium, comprising instructions for:
providing an interface at a topic management server for communicating with a plurality of communication components with a plurality of communications, the plurality of communication components characterized by one of a plurality of communication modes, the plurality of communication components including a first client side topic management component at a first client device and a second client side topic management component at a second client device;

generating topics using the plurality of communications from each of the plurality of communication components and based on communication attributes of the plurality of communications; and storing the topics, wherein each of the topics comprises a unique topic identifier (id), a set of user ids, each user id unique to a user collaborating on each topic, a portion of the communication attributes, the portion of communication attributes used to generate each topic, a topic subject defining a subject of each topic, one of the plurality of communication modes defining a topic mode for each topic, and a plurality of topic communications comprising a subset of the plurality of communications;

receiving a notification from the first client side topic management component at the interface, wherein the notification indicates that a first communication is being created at the first client device and the notification was sent from the first client side topic management component before the first communication is sent from the first client device;

in response to receiving the notification, generating a first communication identifier at the topic management server, and returning the first communication identifier to the first client side topic management component;

creating a communication chain topic entry associated with the first communication identifier, wherein the communication chain topic entry is associated with one or more of the topics;

receiving a second communication identifier from the first client side topic management component at the interface, wherein the second communication identifier is associated with the sending of the first communication by a communication platform associated with the first client device and the second communication identifier is sent by the first client side topic management component in association with the first communication identifier;

associating the communication chain topic entry with the received second communication identifier;

receiving, at the interface, a request associated with the second communication identifier from the second client side topic management component at the second client device;

based on the second communication identifier associated with the request, accessing the communication chain topic entry to retrieve the one or more of the topics associated with the communication chain topic entry; and returning the one of more of the topics to the second client side topic management component.

16. The non-transitory computer readable medium of claim 15, further comprising receiving a new communication and updating the plurality of topic communications for one of the topics based on attributes of the new communication.

17. The non-transitory computer readable medium of claim 15, further comprising:

receiving an open topic command from one of the one or more client devices to open a new topic and, in response, generating and storing one of the topics; and receiving a close topic command from the one of the one or more client devices to close the generated one of the topics and, in response, deleting the generated one of the topics and archiving the generated one of the topics.

18. The non-transitory computer readable medium of claim 15, wherein each communication mode has a corresponding plug-in installed at one or more client devices.

19. The non-transitory computer readable medium of claim 18, wherein the plurality of communication modes comprises chat, email, and video, and the corresponding plug-in for a communication mode is adapted for receiving user input and distributing user input from and to a user collaborating on one of the topics over the communication mode.

20. The non-transitory computer readable medium of claim 15, further comprising:

analyzing the plurality of communications to generate one of the topics; and deriving a topic subject and a portion of communication attributes for the one generated topic.

21. The non-transitory computer readable medium of claim 20, further comprising:

receiving a new communication;

forwarding the new communication to a topic analytics component;

identifying one of the topics associated with the new communication; and updating the plurality of topic communications for the identified one of the topics based on attributes of the new communication.

* * * * *